United States Patent
Löhr et al.

(10) Patent No.: US 12,526,849 B2
(45) Date of Patent: Jan. 13, 2026

(54) METHOD AND APPARATUS FOR MORE POWER EFFICIENT PHYSICAL DOWNLINK CONTROL CHANNEL MONITORING AFTER A RANDOM ACCESS TRANSMISSION

(71) Applicant: Lenovo (Singapore) Pte. Limited, New Tech Park (SG)

(72) Inventors: Joachim Löhr, Wiesbaden (DE); Hyejung Jung, Northbrook, IL (US); Abir Ben Hadj Fredj, Frankfurt (DE); Vijay Nangia, Woodridge, IL (US); Ravi Kuchibhotla, Clarendon Hills, IL (US)

(73) Assignee: Lenovo (Singapore) Pte. Limited, New Tech Park (SG)

( * ) Notice: Subject to any disclaimer, the term of this patent is extended or adjusted under 35 U.S.C. 154(b) by 384 days.

(21) Appl. No.: 18/009,318

(22) PCT Filed: Jun. 10, 2021

(86) PCT No.: PCT/US2021/036722
§ 371 (c)(1),
(2) Date: Dec. 8, 2022

(87) PCT Pub. No.: WO2021/252710
PCT Pub. Date: Dec. 16, 2021

(65) Prior Publication Data
US 2023/0217506 A1      Jul. 6, 2023

Related U.S. Application Data

(60) Provisional application No. 63/037,525, filed on Jun. 10, 2020.

(51) Int. Cl.
*H04W 74/08* (2024.01)
*H04W 74/00* (2009.01)
(Continued)

(52) U.S. Cl.
CPC ...... *H04W 74/0841* (2013.01); *H04W 74/006* (2013.01); *H04W 74/0833* (2013.01); *H04W 74/0836* (2024.01)

(58) Field of Classification Search
CPC .......... H04W 74/0841; H04W 74/006; H04W 74/0833; H04W 74/0836; H04W 52/0216; H04W 52/0229; Y02D 30/70
See application file for complete search history.

(56) References Cited

U.S. PATENT DOCUMENTS

2020/0404713 A1* 12/2020 Sakhnini ........... H04W 56/0045
2020/0413451 A1* 12/2020 Taherzadeh Boroujeni ................
H04B 7/18504
(Continued)

FOREIGN PATENT DOCUMENTS

WO      2019161044 A1    8/2019

OTHER PUBLICATIONS

PCT International Search Report for PCT/US2021/036722, Joachim Lohr et al., mailing date—Oct. 1, 2021.
(Continued)

*Primary Examiner* — Rasheed Gidado
(74) *Attorney, Agent, or Firm* — FIG. 1 Patents

(57) ABSTRACT

A method and apparatus are provided, in which a configuration including a number of symbols for delaying monitoring a physical downlink control channel (PDCCH) in a search space set associated with each of at least one type of physical random access channel (PRACH) occasions is determined (202). A PRACH preamble is transmitted (204) in a PRACH occasion for an identified type of PRACH occasion. In response to the transmission of the PRACH preamble in the PRACH, the PDCCH is monitored (206) for a random access response in the search space set associated with a control resource set (CORESET) during a window,
(Continued)

wherein the window starts at a first symbol of the earliest CORESET that the user equipment is configured to receive the PDCCH that is at least the configured number of symbols for the identified type of PRACH occasion after the last symbol of the PRACH occasion.

20 Claims, 4 Drawing Sheets

(51) Int. Cl.
*H04W 74/0833* (2024.01)
*H04W 74/0836* (2024.01)

(56) References Cited

U.S. PATENT DOCUMENTS

2021/0068162 A1* 3/2021 Agiwal ................ H04L 5/0048
2022/0015153 A1* 1/2022 He ..................... H04W 74/0833

OTHER PUBLICATIONS

3GPP TR 22.804 V16.2.0 (Dec. 2018), 3rd Generation Partnership Project; Technical Specification Group Services and System Aspects; Study on Communication for Automation in Vertical Domains (Release 16).
3GPP TR 22.832 V17.1.0 (Dec. 2019), 3rd Generation Partnership Project; Technical Specification Group Services and System Aspects; Study on enhancements for cyber-physical control applications in vertical domains; Stage 1 (Release 17).
3GPP TR 38.840 V16.0.0 (Jun. 2019), 3rd Generation Partnership Project; Technical Specification Group Radio Access Network; NR; Study on User Equipment (UE) power saving in NR (Release 16).
3GPP TS 22.104 V17.2.0 (Dec. 2019), 3rd Generation Partnership Project; Technical Specification Group Services and System Aspects; Service requirements for cyber-physical control applications in vertical domains; Stage 1 (Release 17).
3GPP TS 38.212 V16.1.0 (Mar. 2020), 3rd Generation Partnership Project; Technical Specification Group Radio Access Network; NR; Multiplexing and channel coding (Release 16).
3GPP TS 38.213 V16.1.0 (Mar. 2020), 3rd Generation Partnership Project; Technical Specification Group Radio Access Network; NR; Physical layer procedures for control (Release 16).
3GPP TS 38.214 V16.1.0 (Mar. 2020), 3rd Generation Partnership Project; Technical Specification Group Radio Access Network; NR; Physical layer procedures for data (Release 16).
3GPP TS 38.321 V16.0.0 (Mar. 2020), 3rd Generation Partnership Project; Technical Specification Group Radio Access Network; NR; Medium Access Control (MAC) protocol specification (Release 16).
3GPP TS 38.331 V16.0.0 (Mar. 2020), 3rd Generation Partnership Project; Technical Specification Group Radio Access Network; NR; Radio Resource Control (RRC) protocol specification (Release 16).
Ericsson, "NR random-access response design", R1-1708731, for 3GPP TSG-RAN Meeting #89, Hangzhou, China, May 15-19, 2017.
Ericsson, "New SID on support of reduced capability NR devices", RP-193238, for 3GPP TSG RAN Meeting #86, Sitges, Spain, Dec. 9-12, 2019.
"Foreign Office Action", Chinese Application No. 202180041651.3, May 19, 2025, 7 pages.

* cited by examiner

METHOD AND APPARATUS FOR MORE POWER EFFICIENT PHYSICAL DOWNLINK CONTROL CHANNEL MONITORING AFTER A RANDOM ACCESS TRANSMISSION

FIELD OF THE INVENTION

The present disclosure is directed to methods and apparatus for managing the monitoring of the physical downlink control channel, and more specifically to a particular user equipment that avoids monitoring the channel, in instances in which the channel is unlikely to be communicating information more directly relevant to the particular user equipment, such as a random access response relevant to the user equipment, in response to a random access transmission.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

As part of communicating with the network, a user equipment does not always know when an incoming communication is going to be received from the network. Furthermore, always actively monitoring for an incoming communication by the user equipment can involve needing to maintain certain portions of the electronic circuitry in an active state, where larger amounts of power may be required by the corresponding circuitry to maintain the circuitry in the active state.

As a way to help conserve power, various forms of discontinuous reception modes have been implemented, which seek to limit the duration in which a user device needs to be actively monitoring for incoming communications by defining periods of inactivity relative to the monitoring of at least some forms of incoming communications. These periods are often generally known to the network, so that attempts to contact the user equipment by the network can be limited to one of these previously determined windows of active monitoring and/or availability.

One of the challenges with managing the periods of availability in which the user equipment is monitoring for incoming communications, is that in some instances, any incoming communication may sometimes need to be delayed until an active window of monitoring for a particular user equipment becomes available. In some instances, the incoming communication could be associated with a requested scheduling grant related to the anticipated transmission to the network by the user equipment of data to be sent to the network, that may have different degrees of tolerance for any such delay.

For some types of devices, there may be an increased incentive for managing the available periods of time that a device is available for receiving an incoming communication, and correspondingly when a device is unavailable and may be able to place one or more portions of its electronic circuitry into an inactive state during which overall power consumption for the device can be reduced. One such type of device can include at least some forms of reduced capability user equipment, which can sometimes be intended to operate for extended periods of time unattended under a single charge. To the extent that overall power consumption can be further reduced, the device may be better able to operate under a single charge for an even larger extended period of time.

The present inventors have recognized that it would be beneficial to better manage the monitoring of a control channel that includes a random access response to better coincide with instances in which such a response is expected to be communicated, such as after one or more types of random access channel occasions has occurred, including instances generally requesting access to a shared communication channel, and or more specific types of instances, such as a beam failure recovery request. In some instances a timer or a determined offset can be used to even further manage a delay associated with the start of the monitoring of a control channel, to help identify the time between when the user equipment requests random access to a channel for communicating with the network, and the anticipated delay associated with the network in responding to such a request.

SUMMARY

The present application provides a method in a user equipment for communicating within a network. The method includes determining a configuration including a number of symbols for delaying monitoring a physical downlink control channel in a search space set associated with each one of at least one type of physical random access channel occasions. A physical random access channel preamble is transmitted to the network in a physical random access channel occasion for an identified type of physical random access channel occasion. In response to the transmission of the physical random access channel preamble in the physical random access channel, the physical downlink control channel is monitored for a random access response in the search space set associated with a control resource set during a window of time, wherein the window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission of the physical random access channel preamble in the physical random access channel occasion.

According to another possible embodiment, a user equipment for communicating within a network is provided. The user equipment includes a controller that determines a configuration including a number of symbols for delaying monitoring of a physical downlink control channel in a search space set associated with each one of at least one type of physical random access channel occasions. The user equipment further includes a transceiver that transmits to the network a physical random access channel preamble in a physical random access channel occasion for an identified type of physical random access channel occasion. In response to the transmission of the physical random access channel preamble in the physical random access channel, the controller further monitors the physical downlink control channel for a random access channel response in the search space set associated with a control resource set during a window of time, wherein the window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission of the physical random access channel preamble in the physical random access channel occasion.

According to a further possible embodiment, a method in a network entity for communicating with a user equipment is provided. The method includes determining a configuration including a number of symbols for the user equipment to delay monitoring of a physical downlink control channel in a search space set associated with each one of at least one type of physical random access channel occasions, and communicating the configuration to the user equipment. A physical random access channel preamble is received from the user equipment in a physical random access channel occasion for an identified type of physical random access channel occasion, wherein the user equipment is configured to monitor the physical downlink control channel for a random access channel response in the search space set associated with a control resource set during a window of time in which the network entity responds to the type of physical random access channel occasion. The window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission by the user equipment of the physical random access channel preamble in the physical random access channel occasion.

According to a still further possible embodiment, a network entity for communicating with a user equipment is provided. The network entity includes a controller that determines a configuration including a number of symbols for the user equipment to delay monitoring of a physical downlink control channel in a search space set associated with each one of at least one type of physical random access channel occasions, and a transceiver that communicates the configuration to the user equipment. The transceiver further receives from the user equipment a physical random access channel preamble in a physical random access channel occasion for an identified type of physical random access channel occasion. The user equipment is configured to monitor the physical downlink control channel for a random access channel response in the search space set associated with a control resource set during a window of time in which the network entity responds to the type of physical random access channel occasion. The window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission by the user equipment of the physical random access channel preamble in the physical random access channel occasion.

These and other features, and advantages of the present application are evident from the following description of one or more preferred embodiments, with reference to the accompanying drawings.

DETAILED DESCRIPTION OF THE PREFERRED EMBODIMENT(S)

Figure 1:
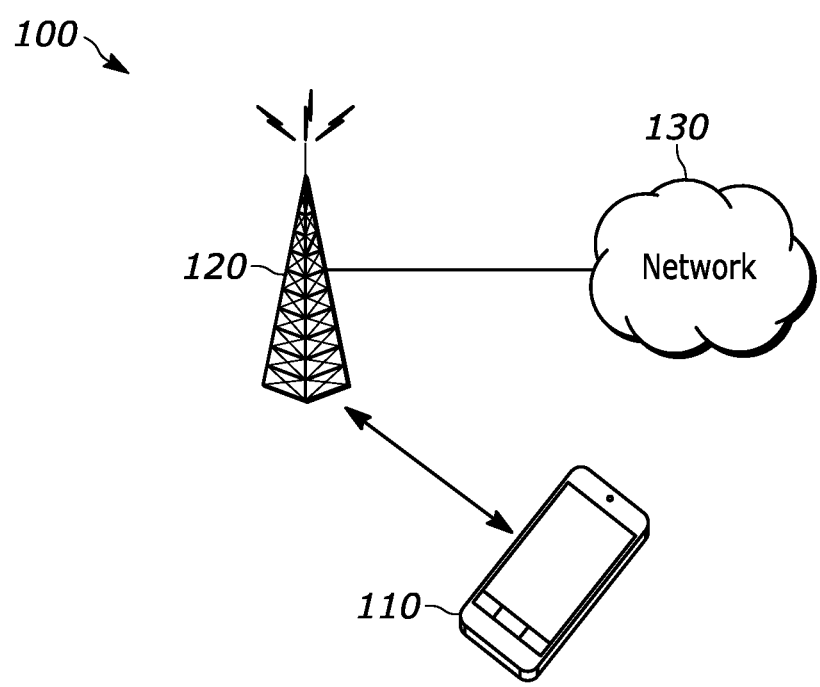
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide more power efficient physical downlink control channel (PDCCH) monitoring.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Fifth generation (5G) has been introduced for the purposes of connecting everything to anything. Prominent among the use cases is the need to connect Internet of Things (IoT) devices to monitoring stations for purposes of generating actions based on data analytics. It is also desired to monitor in real time events in critical areas in order to provide necessary security or other related monitoring functionality. Wireless sensors are one example of such devices. It can be advantageous for these devices to have a long battery life in order to help better ensure that the cost of operations and maintenance is relatively low. In particular, it can be beneficial that the battery life of such devices are long in order to avoid replacement and avoid the cost of connecting to a wired power source. Power savings have for a long time been a prominent goal of wireless devices including smartphones. In the case of wireless sensors and similar IoT devices this desire may be even more pronounced due to the large number of such devices that is envisioned in a connected world.

This motivation is reflected in at least some prior publications, such as 3GPP RP-193238, entitled new study item (SID) on support of reduced capability NR devices, which aims to study various mechanisms that might be needed in support of reduced capability type devices, similar to other connected industries, such as 5G connectivity, which can serve as catalyst for the next wave of smart city innovations. As an example, 3GPP technical report (TR) 22.804 describes a smart city use case and several possible anticipated requirements for such a use case. The exemplary smart city vertical domains discussed cover data collection and processing, which is directed to more efficiently monitor and control city resources, and to provide services to city residents. This includes the deployment of surveillance cameras as being a potentiall important aspect of the smart city but also of factories and industries of the future.

Further, the wearable's use case can include smart watches, rings, eHealth related devices, and medical monitoring devices etc. At least one characteristic for such a use case can include that the device is small in size.

As a baseline, exemplary requirements for these three use cases can include:

Generic requirements:

Device complexity: at least one motivation for the new device type may be to lower the device cost and complexity as compared to high-end enhanced mobile broadband (eMBB) and ultra-reliable low latency communication (URLLC) devices of Rel-15/Rel-16. Device cost is generally a factor for all devices, but device cost sensitivity can at least sometimes be more of a factor and/or a concern for at least some types of devices, such as industrial sensors.

Device size: Requirement for most use cases is that the standard enables a device design with a more compact form factor.

Deployment scenarios: System should support all frequency range 1 (FR1)/frequency range 2 (FR2) bands for frequency division duplex (FDD) and time division duplex (TDD).

Use case specific requirements:

Industrial wireless sensors: reference use cases and requirements are described in 3GPP technical report (TR) 22.832, entitled technical specification group services and system aspects, study on enhancements for cyber-physical control applications in vertical domains, and TS 22.104, entitled technical specification group services and system aspects, service requirements for cyber-physical control applications in vertical domains: communication service availability is 99.99% and end-to-end latency is less than 100 ms. The reference bit rate is less than 2 Mbps (potentially asymmetric e.g. uplink (UL) heavy traffic) for all use cases and the device is stationary. The battery should last at least few years. For safety related sensors, latency requirement is lower, 5-10 ms (TR 22.804)

Video Surveillance: As described in TS 22.804, references an economic video bit rate that would be 2-4 Mbps, have a latency <500 ms, and have a reliability of between 99%-99.9%. High-end video e.g. for farming would require 7.5-25 Mbps. It is noted that traffic pattern is dominated by UL transmissions.

Wearables: Reference bit rate for smart wearable application can be 10-50 Mbps for downlink (DL) and minimum 5 Mbps for UL and the peak bit rate of the device could be higher, such as 150 Mbps for downlink and 50 Mbps for uplink. The battery of the device should last multiple days (up to 1-2 weeks).

It is therefore interesting to study and specify a UE feature and parameter list with lower end capabilities, relative to Release 16 eMBB and ultra-reliable low-latency communication (URLLC) NR to serve the three use cases mentioned above and identify methods to achieve power saving and lower complexity operations.

Some present standards can provide some support for this type of communication. Particular examples can include:

PDCCH Monitoring in 3GPP NR Rel-15/16

3GPP TS 38.213, entitled technical specification group radio access network, NR, physical layer procedures for control, specifies the procedures in the 5G UE to monitor and decode PDCCH grants addressed to it.

A UE monitors a set of PDCCH candidates in one or more core resource sets (CORESETs) on the active DL bandwidth part (BWP) on each activated serving cell configured with PDCCH monitoring according to corresponding search space sets where monitoring implies decoding each PDCCH candidate according to the monitored downlink control information (DCI) formats.

If a UE is provided PDCCHMonitoringCapabilityConfig for a serving cell, the UE obtains an indication to monitor PDCCH on the serving cell for a maximum number of PDCCH candidates and non-overlapping control channel elements (CCEs)

per slot, as in Tables 10.1-2 and 10.1-3, if PDCCHMornitoringCapabilityConfig=R15 PDCCH monitoring capability, or per span, as in Tables 10.1-2A and 10.1-3A, if PDCCHMornitoringCapabilityConfig=R16 PDCCH monitoring capability If the UE is not provided PDCCHMonitoringCapability-Config, the UE monitors PDCCH on the serving cell per slot.

A UE capability for PDCCH monitoring per slot or per span on an active DL BWP of a serving cell is defined by a maximum number of PDCCH candidates and non-overlapped CCEs the UE can monitor per slot or per span, respectively, on the active DL BWP of the serving cell.

A set of PDCCH candidates for a UE to monitor is defined in terms of PDCCH search space sets. A search space set can be a common search space (CSS) set or a UE specific search space (USS) set. A UE monitors PDCCH candidates in one or more of the following search spaces sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with cyclic redundancy check (CRC) scrambled by a system information radio network temporary identifier (SI-RNTI) on the primary cell of the master cell group (MCG)

a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a random access radio network temporary identifier (RA-RNTI) or a temporary cell radio network temporary identifier (TC-RNTI) on the primary cell a Type2-PDCCH CSS set configured by paging-SearchSpace in PDCCH-ConfigCommon for a DCI format with CRC scrambled by a paging radio network temporary identifier (P-RNTI) on the primary cell of the MCG a Type3-PDCCH CSS set configured by SearchSpace in PDCCH-Config with searchSpaceType=common for DCI formats with CRC scrambled by interruption radio network temporary identifier (INT-RNTI), slot format indication radio network temporary identifier (SFI-RNTI), transmit power control physical uplink shared channel radio network temporary identifier (TPC-PUSCH-RNTI), transmit power control physical uplink control channel radio network temporary identifier (TPC-PUCCH-RNTI), transmit power control sounding reference symbols radio network temporary identifier (TPC-SRS-RNTI), CI-RNTI, or PS-RNTI and, only for the primary cell, cell radio network temporary identifier (C-RNTI), modulation coding scheme cell radio network temporary identifier (MCS-C-RNTI), or configured scheduling radio network temporary identifiers (CS-RNTI(s)), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A PDCCH transports downlink control information for one or more cells with one RNTI.

The following coding steps can be identified:
Information element multiplexing
CRC attachment
Channel coding
Rate matching The DCI formats defined in table 7.3.1-1 of TS 38.212, entitled technical specification group radio access network, NR, multiplexing and channel coding, are supported.

TABLE 7.3.1-1

| DCI formats | |
|---|---|
| DCI format | Usage |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause [x.x] of [10, TS 38.473] |

TABLE 7.3.1-1-continued

| DCI formats | |
|---|---|
| DCI format | Usage |
| 2_6 | Notifying the power saving information outside DRX Active Time for one or more UEs |
| 3_0 | Scheduling of NR sidelink in one cell |
| 3_1 | Scheduling of LTE sidelink in one cell |

The fields defined in the DCI formats below are mapped to the information bits $a_0$ to $a_{A-1}$ as follows.

Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

If the number of information bits in a DCI format is less than 12 bits, zeros shall be appended to the DCI format until the payload size equals 12.

The size of each DCI format is determined by the configuration of the corresponding active bandwidth part of the scheduled cell and shall be adjusted as described in clause 7.3.1.0 if necessary.

It is known [TR 38.840 entitled technical specification group radio access network, NR, study on user equipment power saving in NR] that the UE power consumption can be reduced when the number of UE PDCCH monitoring occasions and/or the number of PDCCH blind decoding is reduced.

The power saving schemes to reduce PDCCH monitoring and blind decoding for further studies are as follows, Triggering of PDCCH monitoring—dynamic trigger through layer 1 (L1) signal/signalling
Power saving signal triggering PDCCH monitoring
Go-to-sleep signalling to skip PDCCH monitoring
PDCCH skipping—
DCI based indication for PDCCH skipping (e.g., indication in DCI content, new slot format indication (SFI) state).
L1 signal/signalling (other than DCI) based triggering
Multiple CORESET/search space configurations
Configuration of different PDCCH periodicities with dynamic signalling
Adaptation of CORESET/search space configuration—DCI/timer/hybrid automatic repeat request (HARD)-acknowledgment (ACK) based indication
Dynamic/semi-persistent CORESET/search space ON/OFF
Adaptation between discontinuous reception (DRX) ON duration timer and inactivity timer
Separated PDCCH monitoring of DL and UL
L1 signalling triggering to assist UE in reducing the number of PDCCH blind decoding
Reduced PDCCH monitoring on SCell (including cross carrier scheduling)
Network assistance—reference signal (RS) is dynamically transmitted based on the need to assist UE performing synchronization, channel tracking, measurements and channel estimations before PDCCH decoding The power saving schemes for reducing PDCCH monitoring shows 5%-85% power saving gains with different detailed schemes comparing to the assumed baseline scheme of Rel-15 PDCCH monitoring for the purpose of evaluation, although each of the different detailed schemes offers various power saving gains. Lower power saving gains 5%-15% were observed for the continuous traffic. High power saving gains 50%-85% was observed for sporadic traffic arrival. This comes at the expense of reduced UPT throughput in the range of 5%-43%, and increased latency in the range of 0%-115% (which does not necessarily result in exceeding the corresponding delay budget). This also comes at the expense of additional overhead in the range of 0%-26.53% in terms of DL resource usage.

For Discontinuous Reception (DRX) in TS 38.321, entitled technical specification group radio access network, NR, medium access control protocol specification:

The MAC entity may be configured by radio resource control (RRC) with a DRX functionality that controls the UE's PDCCH monitoring activity for the medium access control (MAC) entity's C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213. RRC controls DRX operation by configuring the following parameters:

drx-onDurationTimer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity;
  ps-Wakeup (optional): the configuration to start associated drx-onDurationTimer in case DCI with CRC scrambled by PS-RNTI (DCP) is monitored but not detected;
  ps-Periodic CSI_Transmit (optional): the configuration to report periodic CSI during the time duration indicated by drx-onDurationTimer in case DCP is configured but associated drx-onDurationTimer is not started;
  ps-TransmitPeriodicL1-RSRP (optional): the configuration to transmit periodic L1-RSRP report(s) during the time duration indicated by drx-onDurationTimer in case DCP is configured but associated drx-onDuration-Timer is not started.

When a DRX cycle is configured, the Active Time includes the time while:
  drx-onDurationTimer or drx-InactivityTimer or drx-RetransmissionTimerDL or drx-RetransmissionTimerUL or ra-ContentionResolutionTimer (as described in clause 5.1.5) is running; or
  a Scheduling Request is sent on physical uplink control channel (PUCCH) and is pending (as described in clause 5.4.4); or
  a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:
  1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-RetransmissionTimerDL for the corresponding HARQ process.
  1> if a MAC PDU is transmitted in a configured uplink grant:
    2> start the drx-HARQ-RTT-TimerUL for the corresponding HARQ process in the first symbol after the end of the first repetition of the corresponding physical uplink shared channel (PUSCH) transmission;
    2> stop the drx-RetransmissionTimerUL for the corresponding HARQ process.
  1> if a drx-HARQ-RTT-TimerDL expires:
    2> if the data of the corresponding HARQ process was not successfully decoded:
      3> start the drx-RetransmissionTimerDL for the corresponding HARQ process in the first symbol after the expiry of drx-HARQ-RTT-TimerDL.
  1> if a drx-HARQ-RTT-TimerUL expires:
    2> start the drx-RetransmissionTimerUL for the corresponding HARQ process in the first symbol after the expiry of drx-HARQ-RTT-TimerUL.
  1> if a DRX Command MAC CE or a Long DRX Command MAC CE is received:
    2> stop drx-onDurationTimer;
    2> stop drx-Inactivity Timer.
  1> if drx-Inactivity Timer expires or a DRX Command MAC CE is received:
    2> if the Short DRX cycle is configured:
      3> start or restart drx-ShortCycleTimer in the first symbol after the expiry of drx-InactivityTimer or in the first symbol after the end of DRX Command MAC CE reception;
      3> use the Short DRX Cycle.
    2> else:
      3> use the Long DRX cycle.
  1> if drx-ShortCycleTimer expires:
    2> use the Long DRX cycle.
  1> if a Long DRX Command MAC CE is received:
    2> stop drx-ShortCycleTimer;
    2> use the Long DRX cycle.
  1> if the Short DRX Cycle is used, and [(SFN×10)+ subframe number] modulo (drx-ShortCycle)=(drx-StartOffset) modulo (drx-ShortCycle):
    2> start drx-onDurationTimer after drx-SlotOffset from the beginning of the subframe.

1> if the Long DRX Cycle is used, and [(SFN×10)+ subframe number] modulo (drx-LongCycle)=drx-StartOffset:
  2> if DCP is configured for the active DL BWP:
    3> if DCP indication associated with the current DRX Cycle received from lower layer indicated to start drx-onDurationTimer, as specified in TS 38.213; or
    3> if all DCP occasion(s) in time domain, as specified in TS 38.213, associated with the current DRX Cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap; or
    3> if ps-Wakeup is configured with value true and DCP indication associated with the current DRX Cycle has not been received from lower layers:
      4> start drx-onDurationTimer after drx-SlotOffset from the beginning of the subframe.
  2> else:
    3> start drx-onDurationTimer after drx-SlotOffset from the beginning of the subframe.

NOTE 1: In case of unaligned SFN across carriers in a cell group, the SFN of the SpCell is used to calculate the DRX duration.

1> if the MAC entity is in Active Time:
  2> monitor the PDCCH as specified in TS 38.213;
  2> if the PDCCH indicates a DL transmission:
    3> start the drx-HARQ-RTT-TimerDL for the corresponding HARQ process in the first symbol after the end of the corresponding transmission carrying the DL HARQ feedback, regardless of LBT failure indication from lower layers;

NOTE 2: When HARQ feedback is postponed by physical downlink shared channel (PDSCH)-to-HARQ feedback timing indicating a non-numerical k1 value, as specified in TS 38.213, the corresponding transmission opportunity to send the DL HARQ feedback is indicated in a later PDCCH requesting the HARQ-ACK feedback.

3> stop the drx-RetransmissionTimerDL for the corresponding HARQ process.
    3> if the PDSCH-to-HARQ feedback timing indicate a non-numerical k1 value as specified in TS 38.213:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission, regardless of LBT failure indication from lower layers;
    3> stop the drx-RetransmissionTimerUL for the corresponding HARQ process.
  2> if the PDCCH indicates a new transmission (DL or UL):
    3> start or restart drx-InactivityTimer in the first symbol after the end of the PDCCH reception.
1> if DCP is configured for the active DL BWP; and
1> if the current symbol n occurs within drx-onDurationTimer duration; and
1> if drx-onDurationTimer associated with the current DRX cycle is not started as specified in this clause; and 1> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
  2> not transmit periodic SRS and semi-persistent SRS defined in TS 38.214, entitled technical specification group radio access network, NR, physical layer procedures for data;
  2> not report semi-persistent CSI configured on PUSCH;
  2> if psPeriodic_CSI_Transmit is not configured with value true:
    3> if ps-TransmitPeriodicL1-RSRP is not configured with value true:
      4> not report periodic CSI on PUCCH.
    3> else:
      4> not report periodic CSI on PUCCH, except L1-RSRP report(s).
1> else:
  2> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214;
    3> not report CSI on PUCCH and semi-persistent CSI configured on PUSCH.
  2> if CSI masking (csi-Mask) is setup by upper layers:
    3> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
      4> not report CSI on PUCCH.

NOTE 3: If a UE multiplexes a CSI configured on PUCCH with other overlapping UCI(s) according to the procedure specified in TS 38.213 clause 9.2.5 and this CSI multiplexed with other UCI(s) would be reported on a PUCCH resource outside DRX Active Time, it is up to UE implementation whether to report this CSI multiplexed with other UCI(s).

Wake Up Signal

A Rel-15 device is expected to monitor all ON-durations in its cDRX pattern. In Rel-16, a wakeup signal can be transmitted to the device ahead of an ON-duration if the network intends to schedule the device in that ON-duration. Thus, if the device does not detect the WUS during the monitoring occasion (MO), it can skip the upcoming PDCCH monitoring (in case the UE is not configured (e.g., ps-Wakeup) to start associated drx-onDurationTimer in case DCP is monitored but not detected). This can provide up to 10 percent additional connected mode energy savings for infrequently scheduled devices, depending on the cDRX settings.

The wake up signal is transmitted using DCI format 2_6 using PS-RNTI. The detailed mechanisms are as follows [TS 38.213].

PDCCH Monitoring Indication and Dormancy/Non-Dormancy Behavior for SCells

A UE configured with DRX mode operation [11, TS 38.321] on the PCell or on the SpCell [12, TS 38.331, entitled technical specification group radio access network, NR, radio resource control (RRC) protocol specification]

a PS-RNTI for DCI format 2_6 by ps-RNTI a number of search space sets, by dci-Format2-6, to monitor PDCCH for detection of DCI format 2_6 on the active DL BWP of the PCell or of the SpCell according to a common search space as described in Clause 10.1 a payload size for DCI format 2_6 by SizeDCI_2-6 a location in DCI format 2_6 of a Wake-up indication bit by PSPositionDCI2-6, where the UE may not start the drx-onDurationTimer for the next long DRX cycle when a value of the Wake-up indication bit is '0', and the UE starts the drx-onDurationTimer for the next long DRX cycle when a value of the Wake-up indication bit is '1' a bitmap, when the UE is provided a number of groups of configured SCells by Scell-groups-for-dormancy-outside-active-time, where the bitmap location is immediately after the Wake-up indication bit location the bitmap size is equal to the number of groups of configured SCells where each bit of the bitmap corresponds to a group of configured SCells from the number of groups of configured SCells a '0' value for a bit of the bitmap indicates an active DL BWP, provided by dormant-BWP, for the UE [11, TS38.321] for each activated SCell in the corresponding group of configured SCells a '1' value for a bit of the bitmap indicates an active DL BWP, provided by first-non-dormant-BWP-ID-for-DCI-outside-active-time, for the UE for each activated SCell in the corresponding group of configured SCells, if a current active DL BWP is the dormant DL BWP a current active DL BWP, for the UE for each activated SCell in the corresponding group of configured SCells, if the current active DL BWP is not the dormant DL BWP an offset by ps-Offset indicating a time, where the UE starts monitoring PDCCH for detection of DCI format 2_6 according to the number of search space sets, prior to a slot where the drx-onDuarationTimer would start on the PCell or on the SpCell [11, TS 38.321]

for each search space set, the PDCCH monitoring occasions are the ones in the first $T_s$ slots indicated by duration, or $T_s=1$ slot if duration is not provided, starting from the first slot of the first $T_s$ slots and ending prior to the start of drx-onDurationTimer.

The UE does not monitor PDCCH for detecting DCI format 2_6 during Active Time [11, TS 38.321].

If a UE reports for an active DL BWP a requirement of X slots prior to the beginning of a slot where the UE would start the drx-onDurationTimer, the UE is not required to monitor PDCCH for detection of DCI format 2_6 during the X slots, where X corresponds to the requirement of the SCS of the active DL BWP.

If a UE is provided search space sets to monitor PDCCH for detection of DCI format 2_6 in the active DL BWP of the PCell or of the SpCell and the UE does not detect DCI format 2_6 if the UE is provided ps-WakeupOrNot, the UE is indicated by ps-WakeupOrNot whether the UE may not start or whether the UE shall start the drx-onDuration-Timer for the next DRX cycle if the UE is not provided ps-WakeupOrNot, the UE may not start Active Time indicated by drx-onDuration-Timer for the next DRX cycle If a UE is provided search space sets to monitor PDCCH for detection of DCI format 2_6 in the active DL BWP of the PCell or of the SpCell and the UE is not required to monitor PDCCH for detection of DCI format 2_6, as described in Clauses 10, 11.1, 12, and in Clause 5.7 of [14, TS 38.321] for all corresponding PDCCH monitoring occasions outside Active Time prior to a next DRX cycle, or does not have any PDCCH monitoring occasions for detection of DCI format 2_6 outside Active Time of a next DRX cycle the UE shall start the drx-onDurationTimer for the next DRX cycle.

If a UE is provided search space sets to monitor PDCCH for detection of DCI format 0_1 and DCI format 1_1 and if one or both of DCI format 0_1 and DCI format 1_1 include a SCell dormancy indication field, the SCell dormancy indication field is a bitmap with size equal to a number of groups of configured SCells, provided by Scell-groups-for-dormancy-within-active-time, each bit of the bitmap corresponds to a group of configured SCells from the number of groups of configured Scells if the UE detects a DCI format 0_1 or a DCI format 1_1 that does not include a carrier indicator field, or detects a DCI format 0_1 or DCI format 1_1 that includes a carrier indicator field with value equal to 0 a '0' value for a bit of the bitmap indicates an active DL BWP, provided by dormant-BWP, for the UE for each activated SCell in the corresponding group of configured SCells a '1' value for a bit of the bitmap indicates an active DL BWP, provided by first-non-dormant-BWP-ID-for-DCI-inside-active-time, for the UE for each activated SCell in the corresponding group of configured SCells, if a current active DL BWP is the dormant DL BWP a current active DL BWP, for the UE for each activated SCell in the corresponding group of configured SCells, if the current active DL BWP is not the dormant DL BWP the UE sets the active DL BWP to the indicated active DL BWP If a UE is provided search space sets to monitor PDCCH for detection of DCI format 1_1, and if the CRC of DCI format 1_1 is scrambled by a C-RNTI or a MCS-C-RNTI, and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 resourceAllocation=dynamicSwitch and all bits of the frequency domain resource assignment field in DCI format 1_1 are equal to 0 or 1 the UE considers the DCI format 1_1 as indicating SCell dormancy, not scheduling a PDSCH reception or indicating a semi-persistent scheduling (SPS) PDSCH release, and for transport block 1 interprets the sequence of fields of modulation and coding scheme new data indicator redundancy version and of
HARQ process number
antenna port(s)
DMRS sequence initialization
as providing a bitmap to each configured SCell, in an ascending order of the SCell index, where
  a '0' value for a bit of the bitmap indicates an active DL BWP, provided by dormant-BWP, for the UE for a corresponding activated SCell
  a '1' value for a bit of the bitmap indicates
    an active DL BWP, provided by first-non-dormant-BWP-ID-for-DCI-inside-active-time, for the UE for a corresponding activated SCell, if a current active DL BWP is the dormant DL BWP
    a current active DL BWP, for the UE for a corresponding activated SCell, if the current active DL BWP is not the dormant DL BWP
  the UE sets the active DL BWP to the indicated active DL BWP If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

A UE is expected to provide HARQ-ACK information in response to a detection of a DCI format 1_1 indicating SCell dormancy after N symbols from the last symbol of a PDCCH providing the DCI format 1_1. If processingType2Enabled of PDSCH-ServingCellConfig is set to enable for the serving cell with the PDCCH providing the DCI format 1_1, N=5 for μ=0, N=5.5 for μ=1, and N=11 for =2; otherwise, N=10 for μ=0, N=12 for μ=1, N=22 for μ=2, and N=25 for μ=3, where μ is the smallest SCS configuration between the SCS configuration of the PDCCH providing the DCI format 1_1 and the SCS configuration of a PUCCH with the HARQ-ACK information in response to the detection of the DCI format 1_1.

Reduced capability UEs such as industrial wireless sensors, video surveillance, and wearables may need to be operated with the battery that should last from multiple days (e.g. wearables) to at least few years (e.g. industrial sensors). The present application includes methods to allow for more power-efficient PDDCH monitoring.

According to current specified behavior, the UE starts monitoring PDCCH for random access response (RAR) at the first symbol of the earliest CORESET, where the UE is configured to receive PDCCH for Type1-PDCCH CSS. Furthermore, the UE monitors during a beam failure recovery (BFR) procedure upon having sent a beam failure recovery request (BFRR), PDCCH (UL/DL) on a search space configured for BFR (SS-BFR) and additionally UE continues monitoring PDCCH candidates in configured search spaces monitored before physical random access channel (PRACH).

In accordance with at least a couple of embodiments of the present application:

Embodiment 1: Time Offset is Introduced for PDCCH Monitoring of Random Access Response Message/MsgB A UE shall only monitor PDCCH for RAR/MsgB after a preconfigured time offset after having sent the PRACH preamble, i.e. considering the required processing time at gNB side and e.g. latency requirements of the data for which uplink-shared channel (UL-SCH) resources are requested

Embodiment 2: UE Decodes Only Specific DCI Formats in Specific Search Spaces During Random Access Procedure UE may only need to monitor for downlink (DL) downlink control information (DCI) formats while monitoring the PDCCH transmission identified by the C-RNTI on the search space indicated by recoverySearchSpaceId. The UE may during the BFR procedure upon having sent the BFRR to the gNB, not monitor PDCCH on other configured search spaces monitored before.

In at least a first embodiment, in response to a PRACH transmission, a UE attempts to detect a DCI format 1_0 with CRC scrambled by a corresponding RA-RNTI during a window, where the window starts at the first symbol of the earliest CORESET the UE is configured to receive PDCCH for Type1-PDCCH CSS set, that is at least a configured number of symbols, after the last symbol of the PRACH occasion corresponding to the PRACH transmission.

In at least a further embodiment, the UE monitors after a preconfigured time offset after having sent the PRACH, PDCCH (only DL DCI) transmission addressed to C-RNTI on the search space indicated by higher layer parameter recoverySearchSpaceId, i.e., SS-BFR.

According to current specified behavior the UE starts monitoring for the Random Access Response message, at the first symbol of the earliest CORSET the UE is configured to receive PDCCH for Type1-PDCCH CSS set, that is at least one symbol, after the last symbol of the PRACH occasion corresponding to the PRACH transmission (as specified in TS38.213). This basically means that UE may (e.g., received configuration of PRACH occasion and CORESET for receiving PDCCH for Type1-PDCCH CSS set that may result in) immediately start PDCCH monitoring for RACH response (RAR) following the PRACH transmission which may be inefficient from power saving perspective.

---

TS38.213
In response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET the UE is configured to receive PDCCH for Type1-PDCCH CSS set, as defined in Clause 10.1, that is at least one symbol, after the last symbol of the PRACH occasion corresponding to the PRACH transmission, where the symbol duration corresponds to the SCS for Type1-PDCCH CSS set as defined in Clause 10.1. The length of the window in number of slots, based on the SCS for Type1-PDCCH CSS set, is provided by ra-Response Window.

---

According to current specifications, UE starts the ra-ContentionResolution Timer at each HARQ retransmission in the first symbol after the end of the Msg3 transmission. Also for this case the PDCCH monitoring activity starts consequently immediately after the Msg3 transmission, which may not be efficient from power saving perspective.

---

TS38.321
5.1.5 Contention Resolution
Once Msg3 is transmitted, regardless of LBT failure indication from lower layers for Msg3, the MAC entity shall:
  1>start the ra-ContentionResolutionTimer and restart the ra-ContentionResolutionTimer at each HARQ retransmission in the first symbol after the end of the Msg3 transmission;

-continued

```
1>monitor the PDCCH while the ra-ContentionResolutionTimer is
  running regardless of the possible occurrence of a measurement gap;
```

Furthermore UE monitors PDCCH for UL as well as DL DCIs, i.e. UE is in ActiveTime while ra-ContentionResolutionTimer is running, even though for some cases it is from a procedural point of view unnecessary to monitor for DL DCI(s) in order to determine whether contention resolution was successful or not.

```
TS38.321
  1>if notification of a reception of a PDCCH transmission of the SpCell
    is received from lower layers:
    2>if the C-RNTI MAC CE was included in Msg3:
      3>if the Random Access procedure was initiated for beam failure
        recovery (as specified in clause 5.17) and the PDCCH
        transmission is addressed to the C-RNTI; or
      3>if the Random Access procedure was initiated by a PDCCH
        order and the PDCCH transmission is addressed to the
        C-RNTI; or
      3>if the Random Access procedure was initiated by the MAC
        sublayer itself or by the RRC sublayer and the PDCCH
        transmission is addressed to the C-RNTI and contains
        a UL grant for a new transmission:
        4>consider this Contention Resolution successful;
```

First Embodiment

As a solution to the first problem and according to a first embodiment, UE may not immediately monitor PDCCH for a random access response (RAR) in response to having sent a PRACH preamble, but may monitor PDCCH only after a preconfigured time offset after having sent the PRACH, i.e. considering the required processing time at gNB side for PRACH detection and RAR message generation/scheduling. According to one implementation of this embodiment, the RAR window starts at the first symbol of the earliest CORESET that the UE is configured to receive PDCCH for Type1-PDCCH CSS set, that is at least a preconfigured symbol_offset, after the last symbol of the PRACH occasion corresponding to the PRACH transmission. The same principle may be also applicable to the 2-step random access procedure, e.g. UE starts monitoring PDCCH for msgB (during msgB-ResponseWindow symbol_offset) at least some preconfigured offset (e.g. symbol_offset), after the last symbol of the MsgA transmission, e.g. physical uplink shared channel (PUSCH) transmission. In one example, the symbol_offset may be a value in number of symbols (or in another example a number of slots) based on the SCS (Subcarrier Spacing) for Type1-PDCCH CSS set, the SCS of the BWP (and possibly UL carrier UL/SUL) where the PRACH preamble is transmitted, PRACH preamble subcarrier spacing of the PRACH transmission, SIB1 subcarrier spacing or a combination thereof (e.g., smallest SCS configuration among the one or more SCS configurations). In one example, for a UE configured with connected DRX (cDRX), the symbol_offset may be based on the smallest value of the drx-HARQ-RTT-TimerUL among all UL HARQ processes for the BWP, such as the BWP where the PRACH preamble is transmitted, i.e. the active BWP. The random access procedure can be triggered by a number of different types of events:
Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary timing advance group (TAG);
Request for Other SI (see clause 7.3);
Beam failure recovery.

According to one aspect of the embodiment, the offset (e.g. symbol_offset) for starting PDDCH monitoring for RAR/MsgB message may be preconfigured to a different value for different types of RACH events. According to one implementation of the embodiment a predefined offset for monitoring PDCCH upon having sent PRACH/MsgA is only applied for a contention-based Random Access procedure for the purpose of scheduling request, i.e. UL data arrival during RRC_CONNECTED when there are no PUCCH resources for SR available. For the other RACH events, the legacy UE behavior with respect to PDCCH monitoring is applied. Such a difference in behavior for the two different cases when RACH is triggered can be justified by the possibility that the UE may be expecting to receive other messages in the DL from the network in the latter case whereas in the case of RACH triggered by scheduling request, the UE is likely requesting resource allocation only due to uplink data arrival and no other message exchange is expected in the interim. According to another implementation of the embodiment, different RACH occasions (RO) may be used by the UE for different RACH events. For example, specific RACH occasions (RO) could be configured/reserved for cases when UE performs the random access procedure in order to request UL-SCH resources, e.g. UL data arrival during RRC_CONNECTED when there are no PUCCH resources for SR available. Similarly, different RACH occasions may be linked to different offsets configured for the start of the corresponding RACH Response window/msgB window. Upon detection of a RACH preamble on a specific RACH occasion/resource gNB knows what offset UE is applying for the reception of corresponding RACH response message respectively MsgB message.

According to a further implementation of this embodiment the UE may during the RACH response window only monitor PDCCH on the Type1-PDCCH Common Search space which is used for Msg2, Msg4 decoding. Hence the UE may during the RACH window, e.g., until RACH response message has been received, not monitor PDCCH on other configured search spaces monitored before RACH. According to one specific implementation of this embodiment, the Type1-PDCCH Common Search space which is used for the RACH related DL transmission is prioritized over other search spaces configured for the UE while the UE performs the random access procedure.

According to a further aspect of the embodiment, depending on which logical channel (LCH) triggered the random access procedure for requesting UL-SCH resources, UE may use different RACH occasions. Basically, a linking between LCH(s) and RACH occasion(s) is introduced. For two-step RACH procedure a linking between PUSCH occasions and LCHs having triggered the random access procedure for requesting UL-SCH resources may be used according to one implementation of the embodiment.

In one implementation, in response to a PRACH transmission, a UE attempts to detect a DCI format 1_0 with CRC scrambled by a corresponding RA-RNTI during a window, where the window starts at the first symbol of the earliest CORESET that the UE is configured to receive PDCCH for Type1-PDCCH CSS set, that is at least a configured number of symbols, after the last symbol of the PRACH occasion corresponding to the PRACH transmission, where the configured number of symbols is determined based on an implicitly indicated LCH priority from the PRACH transmission.

In one implementation, a UE can include an indication of an LCH priority as a payload of a MsgA PUSCH in two-step RACH procedure. In response to a transmission of a PRACH and the MsgA PUSCH, the UE attempts to detect a DCI format 1_0 with CRC scrambled by a corresponding MsgB-RNTI during a window, where the window starts at the first symbol of the earliest CORESET that the UE is configured to receive PDCCH for Type1-PDCCH CSS set, that is at least a configured number of symbols, after the last symbol of the PUSCH occasion corresponding to the PUSCH transmission, where the symbol duration corresponds to the SCS for Type1-PDCCH CSS set and where the configured number of symbols is determined based on the indicated LCH priority in the MsgA PUSCH.

Second Embodiment
(Ra-ContentionResolutionTimer)

According to a second embodiment, the UE starts the ra-ContentionResolutionTimer a preconfigured time offset upon having transmitted Msg3. By not starting the ra-ContentionResolutionTimer immediately upon having sent a HARQ transmission of Msg3, the UE may reduce the power consumption. The UE can enter sleep or micro-sleep mode since the network needs to first transmit a message to the UE in order to resolve contention and during this period the UE may not receive any other message from the network nor is it expected to transmit any other message in the UL and thus the ra-ContentionResolutionTimer can be started from the first instance the UE may expect to receive a downlink message from the network resolving the contention.

As a solution to the second problem, the UE may according to one embodiment only need to monitor for UL grants (DCI formats related to PUSCH) while the ra-ContentionResolutionTimer is running, e.g. in response to having sent Msg3 transmission. By not being required to monitor for DL grants, the UE may reduce the power consumption and reduce complexity. According to one implementation of the embodiment the UE may only monitor PDCCH for UL grants while the ra-ContentionResolutionTimer is running, for cases when the Random Access procedure was initiated by the MAC sublayer itself or by the RRC sublayer, e.g. contention-based random access procedure for requesting UL-SCH resources. Since contention resolution is done based on a received UL grant scheduling an initial UL-SCH transmission, the UE may benefit in terms of power saving when not monitoring DL DCI(s). In some examples, the UE may monitor DL assignment DCI(s) that are the same size as the UL grant DCI(s).

1>if notification of a reception of a PDCCH transmission of the SpCell is received from lower layers:
  2>if the C-RNTI MAC CE was included in Msg3:
    3>if the Random Access procedure was initiated for beam failure recovery (as specified in clause 5.17) and the PDCCH transmission is addressed to the C-RNTI; or
    3>if the Random Access procedure was initiated by a PDCCH order -continued and the PDCCH transmission is addressed to the C-RNTI; or
    3>if the Random Access procedure was initiated by the MAC sublayer itself or by the RRC sublayer and the PDCCH transmission is addressed to the C-RNTI and contains a UL grant for a new transmission:
      4>consider this Contention Resolution successful;

Third Embodiment (SR Retransmission Case)

TS38.321
When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer (as described in clause 5.1.5) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

According to the current specified behavior, the UE is in ActiveTime and monitors PDCCH when SR has been sent on PUCCH and a SR is pending. Therefore the UE stays in ActiveTime upon having (re)transmitted a SR on PUCCH, i.e. SR_COUNTER>=1, for cases when no UL grant has been received in response to previous SR transmission and sr-ProhibitTimer is not running.

According to another embodiment the UE may not stay in ActiveTime in response to having sent a SR on PUCCH triggered by the expiry of the sr-ProhibitTimer for cases when the SR is pending (SR_COUNTER>=1), but only after a preconfigured time offset after having (re)transmitted the SR on PUCCH, i.e. considering the required processing time at gNB side. Similar to the case for the first transmission of a SR triggered by a BSR, also for subsequent (re)transmissions of a SR triggered by the expiry of the sr-ProhibitTimer, the UE goes to DRX (sleep time) for a preconfigured time following the SR (re)transmissions before switching to the ActiveTime and monitoring PDCCH for UL DCI(s). Since UE could be configured with multiple SR configurations, e.g. each SR configuration corresponding to one or more logical channels and/or to SCell beam failure recovery and/or to consistent listen-before-talk (LBT) failure, the time offset may be different for different SR configurations. For example when (re)transmitting a SR on PUCCH for a SR configuration which corresponds to a LCH carrying delay non-critical data the UE may stay a bit longer in DRX before starting to monitor for PDCCH. However for SR(s) corresponding to delay critical data, the time offset should be rather small. The UE may be configured with a one or more time offsets corresponding to one or more SR configurations by higher layer signaling. In one example, a time offset may correspond to a group of SR configurations.

According to one implementation of the embodiment, the network can configure the UE to enter sleep or micro-sleep mode, whereby all or some of its receiver (or transceiver) components are turned off. The network can in such an implementation configure the UE with a first timer, the first timer duration associated with the length of time the UE enters micro-sleep or sleep mode following (re)transmission of the SR. It should be noted that SR transmission may be either triggered by a BSR, i.e. first transmission of a SR, and/or by the expiry of the sr-ProhibitTimer for cases when a SR is pending, i.e. (re)transmission of SR since no UL grant has been detected upon the previous transmission of the SR. The first timer is started after (re)transmission of the SR. The network in one implementation may base the value of the first timer on the basis of the time it needs to process the SR. In this implementation, the timer is a semi-static parameter configured by the network either through RRC or MAC protocols. After transmission of the SR, the UE skips decoding of the UL DCI for a first timer duration and then attempts to decode UL PDCCH grants sent to it in response to the SR. Once this timer expires, the UE starts blind decoding UL DCI.

Fourth Embodiment (RACH for BFR)

1>if the contention-free Random Access Preamble for beam failure
    recovery request was transmitted by the MAC entity:
    2>start the ra-ResponseWindow configured in
        BeamFailureRecoveryConfig at the first PDCCH occasion as
        specified in TS 38.213 from the end of the Random Access Preamble
        transmission;
    2>monitor for a PDCCH transmission on the search space indicated by
        recoverySearchSpaceId of the SpCell identified by the C-RNTI while
        ra-ResponseWindow is running.
else:
    2>start the ra-ResponseWindow configured in RACH-ConfigCommon
        at the first PDCCH occasion as specified in TS 38.213 from the
        end of the Random Access Preamble transmission;
    2>monitor the PDCCH of the SpCell for Random Access Response(s)
        identified by the RA-RNTI while the ra-ResponseWindow is running.

According to current specifications as shown above, UE monitors PDCCH for C-RNTI during the ra-ResponseWindow configured in BeamFailureRecoveryConfig upon having sent a PRACH preamble for beam failure recovery request, whereby the PDCCH monitoring starts at the first PDCCH occasion following the last symbol of the PRACH preamble transmission. Only when a PDCCH transmission addressed to C-RNTI is received on the search space indicated by higher layer parameter recoverySearchSpaceId, i.e., SS-BFR, UE considers a contention-free BFR procedure as successfully terminated. In response to having sent the PRACH for contention-free BFR, the UE continues monitoring PDCCH candidates in configured search spaces monitored before PRACH, in addition to the search space indicated by recovery SearchSpaceId.

According to a further embodiment, UE may not immediately monitor PDCCH for a response message, e.g. Random Access Response (RAR) addressed to the C-RNTI, in response to having sent a PRACH preamble for BFR, but only after a preconfigured time offset after having sent the PRACH, i.e. considering the required processing time at gNB side for PRACH detection and RAR message generation/scheduling. According to one implementation of this embodiment, the RAR window starts at the PDCCH occasion that the UE is configured to receive PDCCH for SS-BFR, that is at least a preconfigured symbol_offset, after the last symbol of the PRACH occasion corresponding to the PRACH transmission. By not monitoring immediately PDCCH for a RACH addressed to C-RNTI, but only after a preconfigured offset, the UE may benefit in terms of power saving.

According to a further aspect of this embodiment, the UE may only need to monitor for DL DCI formats while monitoring PDCCH transmission identified by the C-RNTI on the search space indicated by recoverySearchSpaceId. By not being required to monitor for UL grants, the UE may reduce the power consumption and complexity. In one example, the UE may not monitor or attempt to decode UL DCI formats for UL DCI format sizes different than DL DCI sizes; the UE may continue to monitor UL DCI that is the same size as the DL DCI—e.g., fallback DCI 1_0 and DCI 0_0). The assumption is that gNB will send a downlink message in response to having received a PRACH for BFR e.g. indicates a transmission configuration indicator (TCI) state switch and corresponding beam switch, by means of MAC CE (TCI state activationMAC CE) or DL DCI (DCI based TCI state switch).

According to one further implementation of the embodiment, the UE may only monitor PDCCH transmission identified by the C-RNTI on the search space indicated by recoverySearchSpaceId during the beam failure recovery procedure. Hence, the UE would during the BFR procedure, upon having sent the BFR to the gNB, not monitor PDCCH on other configured search spaces that may have been monitored before.

Fifth Embodiment (Delaying a Triggered SR)

According to another embodiment, the UE delays the transmission of a triggered SR to the next on Duration, e.g. next drx-onDurationTimer duration, or to the next ActiveTime. Such behavior may be linked to the LCH triggering the SR. If a logical channel priority is below a threshold then the UE delays the transmission of the SR to the next ActiveTime or the next onDuration. For cases when the SR is triggered outside the ActiveTime, e.g. UE is in DRX, the UE may not sent the SR on the next available PUCCH resource, but instead transmits the SR on a PUCCH resource which occurs within the next drx-onDurationTimer duration. According to a specific implementation of this embodiment, the UE transmits a SR triggered outside the ActiveTime on a PUCCH resource which occurs within the next drx-onDurationTimer duration for which the drx-onDurationTimer is running. As mentioned before if the DCI with CRC scrambled by PS-RNTI (DCP) is configured, the wake-up signal (e.g., DCI format 2_6 with CRC scrambled with PS-RNTI (Power Saving RNTI) indicates whether UE should start drx-onDurationTimer for the next drx-onDurationTimer duration. According to one implementation of the embodiment, delaying the transmission of a SR may be only applicable for specific configured LCH(s) which are delay tolerant. By not sending a triggered SR immediately on the next available PUCCH resource, but on a PUCCH resource which occurs within the ActiveTime, where the UE is monitoring PDCCH anyways, the UE may get an additional power saving benefit.

Sixth Embodiment (DRX for UL Grants)

According to another embodiment, the UE may monitor UL DCIs only on preconfigured occasions, e.g. slots/subframes/symbols. When there is no data available for transmission in the UE there is no good motivation to monitor PDCCH for UL DCIs allocating UL-SCH resources. According to one implementation, the UE may not monitor PDCCH for UL DCI(s) for cases when there is no data available for transmission in the UE. This may be a similar behavior as skipping an UL grant/transmission for cases when UE receives an UL-SCH resource allocation but does not have any data to transmit. However, since for example aperiodic SRS or CSI which are required e.g. for downlink scheduling (CSI) or beam management, are also scheduled by a UL DCI format, e.g. format 0_1, the UE may still need to monitor for those DCI formats. Therefore and according to one implementation of the embodiment, the UE may only monitor PDCCH for specific UL related DCI formats when the UE has no data available for transmission. In one implementation of this embodiment, the UE may only monitor UL DCI formats, e.g. some specific UL DCI formats, at some predefined occasions, e.g. slots/subframes/symbols. In order to be synchronized between UE and gNB, i.e. gNB should be aware of when the UE is monitoring PDCCH for UL DCI formats, certain rules may be defined for when to start the low PDCCH monitoring activity in the UE. According to one specific implementation of the embodiment, the UE starts a timer upon having received a UL DCI format allocating UL-SCH resources. Upon expiry of such timer, the UE starts the PDCCH (UL DCI) monitoring activity according to some predefined pattern. The timer is (re)started at reception of an UL DCI allocating UL-SCH resources as well as the transmission of a SR on PUCCH.

According to one implementation of the embodiment, the UE may be provided with a DRX pattern/configuration for monitoring UL DCIs and a separate DRX pattern/configuration for monitoring DL DCIs.

In one implementation, a UE monitors PDCCH for UL DCI that has a different size than a DL DCI in a given search space set, if the UE is in Active time and if an UL inactivity timer is running, where the UE starts or restarts the UL inactivity timer in the first symbol after the end of the PDCCH reception including an UL DCI. For UE power saving, it may be beneficial to transmit buffered UL data as soon as possible and turn off some of the Tx chain related components upon completion of transmission of the buffered UL data. Thus, the UE may continue monitoring UL DCI for some time after reception of UL DCI and may stop monitoring UL DCI and turn off the Tx components after the UL inactivity timer expires. In one example, the UE may restart to monitor UL DCI at the beginning of the next DRX cycle, if the UE starts the drx-onDurationTimer for the next DRX cycle. In another example, the UE may restart to monitor UL DCI after transmitting SR and/or BSR on configured grant PUSCH.

In the present application the following aspects can be of interest relative to at least some embodiments:
  Time offset is introduced for PDCCH monitoring of Random Access Response message/MsgB
    The UE attempts to detect a DCI format 1_0 with CRC scrambled by a corresponding RA-RNTI during a window, where the window starts at the first symbol of the earliest CORESET the UE is configured to receive PDCCH for Type1-PDCCH CSS set, that is at least a configured number of symbols, after the last symbol of the PRACH occasion corresponding to the PRACH transmission
    Time offset (e.g. in number of symbols) may be different for different RACH events
    The time offset is determined based on an implicitly indicated LCH priority from the PRACH transmission
    Different RO may be configured for different RACH events, e.g. request for UL-SCH resources
  ra-ContentionResolutionTimer is started a preconfigured time offset upon having (re)transmitted RACH Msg3
    The UE may only monitor PDCCH for UL grants while the ra-ContentionResolution Timer is running, for cases when the random access procedure was initiated by the MAC sublayer itself or by the RRC sublayer in connected mode, e.g. contention-based random access procedure for requesting UL-SCH resources.
  The UE may only need to monitor for DL DCI formats while monitoring PDCCH transmission identified by the C-RNTI on the search space indicated by recoverySearchSpaceId.
    The UE may not monitor or attempt to decode UL DCI formats for UL DCI format sizes different than DL DCI sizes; the UE may continue to monitor UL DCI that is the same size as the DL DCI—e.g, fallback DCI 1_0 and DCI 0_0).
    The UE may only monitor PDCCH transmission identified by the C-RNTI on the search space indicated by recoverySearchSpaceId during the beam failure recovery procedure.
      The UE would during the BFR procedure upon having sent the BFR to the gNB, not monitor PDCCH on other configured search spaces that may have been monitored before.
        SS-BFR which is used for the successful termination of the beam failure recovery procedure is prioritized over other search spaces configured for the UE while the UE performs BFR procedure, since only PDCCH addressed to the C-RNTI received on SS-BFR will terminate the BFR procedure successfully.
  The UE delays the transmission of a triggered SR to the next onDuration, e.g. next drx-onDurationTimer duration, or to the next ActiveTime.
    If a logical channel priority is below a threshold, then the UE delays the transmission of the SR to the next ActiveTime or the next onDuration.
    The UE transmits a SR triggered outside the ActiveTime on a PUCCH resource which occurs within the next drx-onDurationTimer duration for which the drx-onDurationTimer is running.
  The UE may monitor UL DCIs only on preconfigured occasions, e.g. slots/subframes/symbols.
    The UE may only monitor UL DCI formats, e.g. some specific UL DCI formats, at some predefined occasions, e.g. slots/subframes/symbols.
      The UE starts a timer upon having received a UL DCI format allocating UL-SCH resources. Upon expiry of such timer, UE starts the PDCCH (UL DCI) monitoring activity according to some predefined pattern. The timer is (re)started at reception of an UL DCI allocating UL-SCH resources as well as the transmission of a SR on PUCCH.
    According to one implementation of the embodiment, the UE may be provided with a DRX pattern/configuration for monitoring UL DCIs and a separate DRX pattern/configuration for monitoring DL DCIs.

Figure 2:
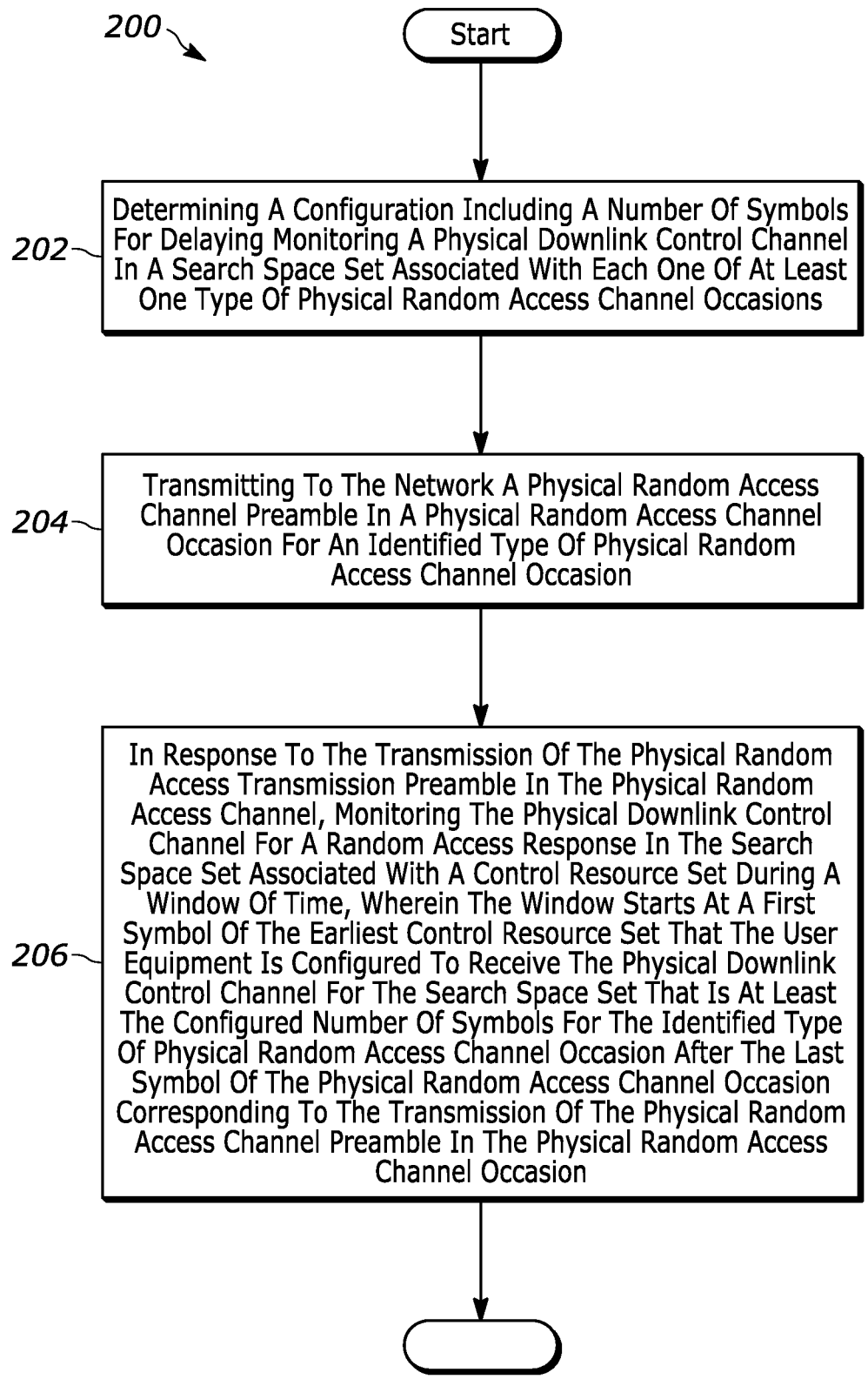
FIG. 2 is a flow diagram in a user equipment associated with establishing the instances during which the monitoring of the physical downlink control channel in the user equipment is set to occur, in accordance with at least one embodiment.

FIG. 2 illustrates a flow diagram 200 in a user equipment associated with establishing the instances during which the monitoring of the physical downlink control channel in the user equipment is set to occur. In accordance with at least one embodiment, the method can include determining 202 a configuration including a number of symbols for delaying monitoring a physical downlink control channel in a search space set associated with each one of at least one type of physical random access channel occasions. A physical random access channel preamble can be transmitted 204 to the network in a physical random access channel occasion for an identified type of physical random access channel occasion. In response to the transmission of the physical random access channel preamble in the physical random access channel, the physical downlink control channel can be monitored 206 for a random access response in the search space set associated with a control resource set during a window of time, wherein the window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission of the physical random access channel preamble in the physical random access channel occasion.

In some instances, the configuration including the number of symbols for delaying the monitoring of the physical downlink control channel in the search space set associated with each one of the at least one type of physical random access channel occasions can be determined as part of a transmission received by the user equipment from the network. In some of these instances, the number of symbols for delaying the monitoring of the physical downlink control channel in the search space set associated with each one of the at least one type of physical random access channel occasions can be expressly identified as part of the transmission received by the user equipment from the network. In other of these instances, the number of symbols for delaying the monitoring of the physical downlink control channel in the search space set associated with each one of the at least one type of physical random access channel occasions can be derived from information included as part of the transmission received by the user equipment from the network. In some of these instances, the information included as part of the transmission can include a number of slots.

In some instances, the configuration including the number of symbols for delaying the monitoring of the physical downlink control channel in the search space set associated with each one of the at least one type of physical random access channel occasions can be determined based on a logical channel priority indication identified from the transmission of the physical random access channel occasion.

In some instances, the at least one type of physical random access channel occasions can include multiple types of physical random access channel occasions including at least a first type of physical random access channel occasion and a second type of physical random access channel occasion. In some of these instances, the configured number of symbols can include a first configured number of symbols for the first type of physical random access channel occasion and a second configured number of symbols for the second type of physical random access channel occasion, where the second configured number of symbols is different than the first configured number of symbols.

In some instances, the user equipment can attempt to detect a downlink control information with cyclic redundancy check scrambled by a corresponding random access radio network temporary identifier during the window of time.

In some instances, the search space set can be a Type1 physical downlink control channel common search space set.

In some instances, the determined configuration including a number of symbols for delaying the monitoring of the physical downlink control channel in the search space set can be applied for a contention-based random access procedure. In some of these instances, the method can further include receiving a physical downlink control channel with a downlink downlink control information within the window of time, wherein a physical downlink shared channel associated with the physical downlink control channel includes a random access response message comprising a random access response uplink grant for the user equipment; transmitting a random access channel Msg3 on the uplink resources indicated by the random access response uplink grant; and starting a random access contention resolution timer with a preconfigured time offset upon having transmitted random access channel Msg3. In further of these instances, the contention-based random access procedure can be a contention-based random access procedure initiated for requesting uplink resources, and the monitoring of the physical downlink control channel by the user equipment can be limited to monitoring an uplink downlink control information while the random access contention resolution timer is running.

In some instances, the physical random access channel occasion can be of a type that is transmitted in response to a beam failure recovery procedure. In some of these instances, the monitoring of the physical downlink control channel by the user equipment can be limited to monitoring a downlink downlink control information addressed to a cell radio network temporary identifier on the search space set, where the search space set is a beam failure recovery search space set configured by higher layers.

Figure 3:
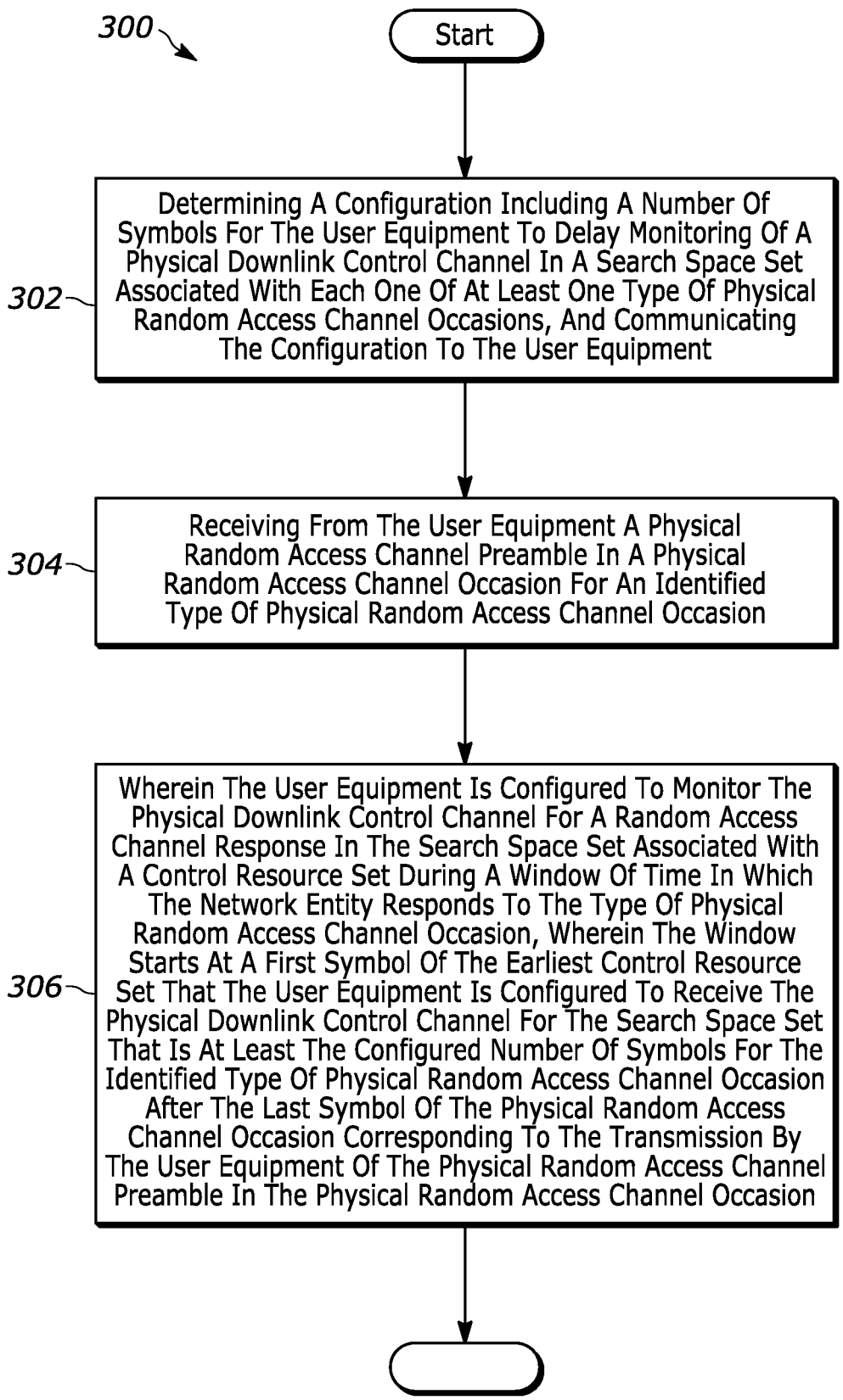
FIG. 3 is a flow diagram in a network entity associated with establishing the instances during which the monitoring of the physical downlink control channel in a user equipment is set to occur.

FIG. 3 illustrates a flow diagram 300 in a network entity associated with establishing the instances during which the monitoring of the physical downlink control channel in a user equipment is set to occur. In accordance with at least one embodiment, the method can include determining 302 a configuration including a number of symbols for the user equipment to delay monitoring of a physical downlink control channel in a search space set associated with each one of at least one type of physical random access channel occasions, and communicating the configuration to the user equipment. A physical random access channel preamble can be received 304 from the user equipment in a physical random access channel occasion for an identified type of physical random access channel occasion, wherein the user equipment can be configured 306 to monitor the physical downlink control channel for a random access channel response in the search space set associated with a control resource set during a window of time in which the network entity responds to the type of physical random access channel occasion. The window starts at a first symbol of the earliest control resource set that the user equipment is configured to receive the physical downlink control channel for the search space set that is at least the configured number of symbols for the identified type of physical random access channel occasion after the last symbol of the physical random access channel occasion corresponding to the transmission by the user equipment of the physical random access channel preamble in the physical random access channel occasion.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
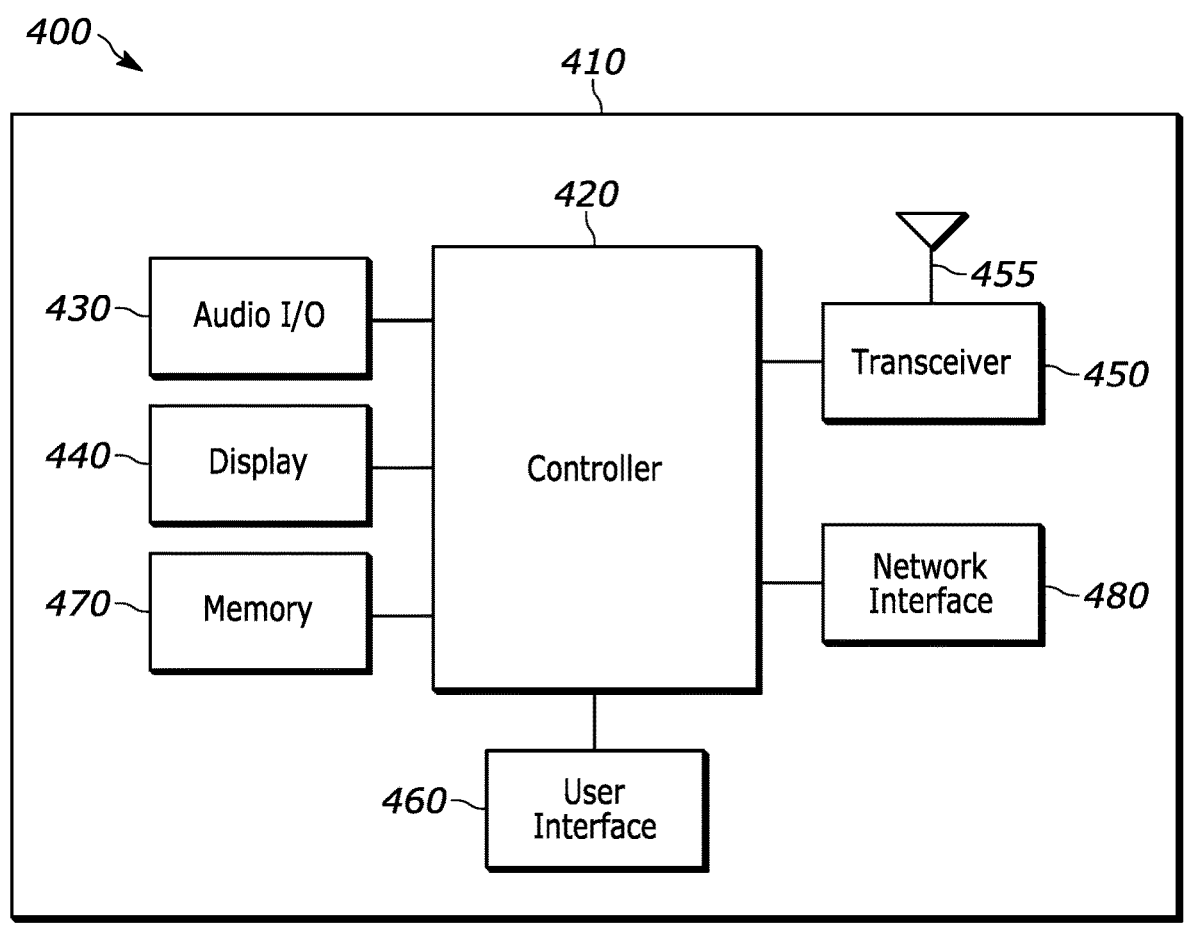
FIG. 4 is an example block diagram of an apparatus according to a possible embodiment.

FIG. 4 is an example block diagram of an apparatus 400, such as the wireless communication device 110, according to a possible embodiment. The apparatus 400 can include a housing 410, a controller 420 within the housing 410, audio input and output circuitry 430 coupled to the controller 420, a display 440 coupled to the controller 420, a transceiver 450 coupled to the controller 420, an antenna 455 coupled to the transceiver 450, a user interface 460 coupled to the controller 420, a memory 470 coupled to the controller 420, and a network interface 480 coupled to the controller 420. The apparatus 400 can perform the methods described in all the embodiments.

The display 440 can be a viewfinder, a liquid crystal display (LCD), a light emitting diode (LED) display, a plasma display, a projection display, a touch screen, or any other device that displays information. The transceiver 450 can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 470 can include a random access memory, a read only memory, an optical memory, a solid state memory, a flash memory, a removable memory, a hard drive, a cache, or any other memory that can be coupled to an apparatus.

The apparatus 400 or the controller 420 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 470 or elsewhere on the apparatus 400. The apparatus 400 or the controller 420 may also use hardware to implement disclosed operations. For example, the controller 420 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
    determining an offset based on a configuration, the offset including a number of slots for delaying monitoring a physical downlink control channel in a search space set, wherein the offset differs based on a type of random access channel event;
    transmitting a physical random access channel preamble in a physical random access channel occasion; and
    in response to transmitting the physical random access channel preamble in the physical random access channel occasion, monitoring the physical downlink control channel for a random access response in the search space set associated with a control resource set during a window of time, wherein the window starts at a first symbol of an earliest control resource set that the UE is configured to receive the physical downlink control channel for the search space set that is at least the determined offset after a last symbol of the physical random access channel occasion corresponding to the transmitted physical random access channel preamble in the physical random access channel occasion.

2. The method of claim 1, wherein the offset including the number of slots for delaying the monitoring of the physical downlink control channel in the search space set is determined as part of a transmission received by the UE from a network.

3. The method of claim 2, wherein the number of slots for delaying the monitoring of the physical downlink control channel in the search space set is expressly identified as part of the transmission received by the UE from the network.

4. The method of claim 2, wherein the number of slots delaying the monitoring of the physical downlink control channel in the search space set is derived from information included as part of the transmission received by the UE from the network.

5. The method of claim 4, wherein the information included as part of the transmission includes the number of slots.

6. The method of claim 1, wherein the configuration including the number of slots for delaying the monitoring of the physical downlink control channel in the search space set is determined based on a logical channel priority indication identified from the transmitted physical random access channel occasion.

7. The method of claim 1, wherein the search space set is associated with each one of at least one type of physical random access channel occasions, and wherein the at least one type of physical random access channel occasions includes multiple types of physical random access channel occasions including at least a first type of physical random access channel occasion and a second type of physical random access channel occasion.

8. The method of claim 7, wherein the number of slots includes a first configured number of slots for the first type of physical random access channel occasion and a second configured number of slots for the second type of physical random access channel occasion, wherein the second configured number of slots is different than the first configured number of slots.

9. The method of claim 1, wherein the UE attempts to detect a downlink control information with cyclic redundancy check scrambled by a corresponding random access radio network temporary identifier during the window of time.

10. The method of claim 1, wherein the search space set is a Type1 physical downlink control channel common search space set.

11. The method of claim 1, wherein the determined offset including the number of slots for delaying the monitoring of the physical downlink control channel in the search space set is applied for a contention-based random access procedure.

12. The method of claim 11, further comprising;
receiving a physical downlink control channel with a downlink control information within the window of time, wherein a physical downlink shared channel associated with the physical downlink control channel includes a random access response message comprising a random access response uplink grant for the UE;
transmitting a random access channel Msg3 on uplink resources indicated by the random access response uplink grant; and
starting a random access contention resolution timer with a preconfigured time offset upon having transmitted random access channel Msg3.

13. The method of claim 12, wherein the contention-based random access procedure is initiated for requesting uplink resources, and the monitoring of the physical downlink control channel by the UE is limited to monitoring an uplink downlink control information while the random access contention resolution timer is running.

14. The method of claim 1, wherein the physical random access channel occasion is of a type that is transmitted in response to a beam failure recovery procedure.

15. The method of claim 14, wherein the monitoring of the physical downlink control channel by the UE is limited to monitoring a downlink control information addressed to a cell radio network temporary identifier on the search space set, wherein the search space set is a beam failure recovery search space set configured by higher layers.

16. A user equipment (UE) for wireless communication, comprising:
one or more memories; and
one or more processors coupled with the one or more memories and individually or collectively operable to cause the UE to:
determine an offset based on a configuration, the offset including a number of slots for delaying monitoring of a physical downlink control channel in a search space set, wherein the offset differs based on a type of random access channel event; and
transmit a physical random access channel preamble in a physical random access channel occasion; and
in response to the transmitted physical random access channel preamble in the physical random access channel occasion, monitor the physical downlink control channel for a random access channel response in the search space set associated with a control resource set during a window of time, wherein the window starts at a first symbol of an earliest control resource set that the UE is configured to receive the physical downlink control channel for the search space set that is at least the determined offset after a last symbol of the physical random access channel occasion corresponding to the transmitted physical random access channel preamble in the physical random access channel occasion.

17. The UE of claim 16, wherein the offset including the number of slots for delaying the monitoring of the physical downlink control channel in the search space set is determined as part of a transmission received by the UE from a network.

18. The UE of claim 16, wherein the determined offset including the number of slots for delaying the monitoring of the physical downlink control channel in the search space set is applied for a contention-based random access procedure.

19. The UE of claim 16, wherein the physical random access channel occasion is of a type that is transmitted in response to a beam failure recovery procedure.

20. A processor for wireless communication, comprising:
at least one controller coupled with at least one memory and operable to cause the processor to:
determine an offset based on a configuration, the offset including a number of slots for delaying monitoring of a physical downlink control channel in a search space set, wherein the offset differs based on a type of random access channel event; and
transmit a physical random access channel preamble in a physical random access channel occasion; and
in response to the transmitted physical random access channel preamble in the physical random access channel occasion, monitor the physical downlink control channel for a random access channel response in the search space set associated with a control resource set during a window of time, wherein the window starts at a first symbol of an earliest control resource set that the UE is configured to receive the physical downlink control channel for the search space set that is at least the determined offset after a last symbol of the physical random access channel occasion corresponding to the transmitted physical random access channel preamble in the physical random access channel occasion.

* * * * *